United States Patent [19]

Riant et al.

[11] Patent Number: 5,732,169

[45] Date of Patent: Mar. 24, 1998

[54] FILTER FOR GUIDED LIGHT, AND AN OPTICAL LINK INCLUDING THE FILTER

[75] Inventors: Isabelle Riant; Pierre Sansonetti, both of Palaiseau, France

[73] Assignee: Alcatel Submarcom, Clichy, France

[21] Appl. No.: 577,765

[22] Filed: Dec. 22, 1995

[30] Foreign Application Priority Data

Dec. 28, 1994 [FR] France .................. 94 15792

[51] Int. Cl.$^6$ .................................. G02B 6/28
[52] U.S. Cl. .............. 385/24; 385/37; 385/14; 385/27; 385/31; 359/130; 372/102; 356/301
[58] Field of Search .................. 385/24, 37, 14, 385/27, 31, 39; 359/130, 152, 154; 372/6, 102; 356/301, 318, 328; 250/458.1

[56] References Cited

U.S. PATENT DOCUMENTS

| | | | |
|---|---|---|---|
| 5,317,576 | 5/1994 | Leonberger et al. | 372/6 |
| 5,400,422 | 3/1995 | Askins et al. | 385/37 |
| 5,561,675 | 10/1996 | Bayon et al. | 385/37 X |
| 5,615,008 | 3/1997 | Stachele | 385/37 X |

FOREIGN PATENT DOCUMENTS

| | | | |
|---|---|---|---|
| 9435217A3 | 7/1991 | European Pat. Off. | 385/37 |
| 0463771A2 | 1/1992 | European Pat. Off. | 385/31 |
| 0629885A1 | 12/1994 | European Pat. Off. | 385/37 |
| WO9324977 | 12/1993 | WIPO . | |

OTHER PUBLICATIONS

R. Kashyap et al, "Wavelength Flattened Saturated Erbium Amplifier Using Multiple Side-Tap Bragg Gratings", *Electronic Letters*, vol. 29, No. 11, 27 May 1993, Enage GB, pp. 1025-1026.

S. V. Chernikov et al, "Coupled–Cavity erbium fiber lasers incorporating fiber grating reflectors", *Optics Letters*, vol. 18, No. 23, 1 Dec. 1993, New York, US pp. 2023-2025.

E. Delevaque et al, "Gain control in erbium–doped fibre amplifiers by lasing at 1480 nm with photo–induced bragg gratings wirtten on fibre ends", *Electronics Letters*, vol. 29, No. 12, 10 Jun. 1993, Enage GB, pp. 1112-1114.

Primary Examiner—Phan T.H. Palmer
Attorney, Agent, or Firm—Sughrue, Mion, Zinn, Macpeak & Seas, PLLC

[57] ABSTRACT

The invention provides a Fabry-Perot filter for guided light, the filter comprising two Bragg gratings that follow each other along a common light guide, a gap being left between the two gratings, wherein the two gratings have respective different lengths. The invention is particularly applicable to optical fiber telecommunications systems.

4 Claims, 2 Drawing Sheets

FILTER FOR GUIDED LIGHT, AND AN OPTICAL LINK INCLUDING THE FILTER

The present invention relates to optical filtering. More particularly, it is applicable to optical fiber telecommunications systems with spectrum multiplexing, and still more particularly to optical links using solitons.

BACKGROUND OF THE INVENTION

Optical fiber links typically include amplifiers for compensating line losses. To limit the noise added by such amplifiers in spectrum-multiplexed links, it is known to insert Fabry-Perot filters with a transmission coefficient having a maximum in each of the multiplexed spectrum channels. More particularly, in soliton links with spectrum multiplexing, such filters also serve to avoid drift in soliton wavelength.

In such spectrum-multiplexed links, troublesome differences in level appear between the various channels. They are typically the result of differences between the gains provided in the channels by the amplifiers.

OBJECTS AND SUMMARY OF THE INVENTION

A particular object of the present invention is to eliminate, or at least to limit, such differences in level.

To this end, the invention provides a filter for guided light, the filter including two Bragg gratings following one another in a common light guide and leaving between them a gap so that together they constitute a Fabry-Perot filter whose transmission coefficient presents a succession of local maxima as a function of wavelength, wherein the two gratings differ mutually, thereby introducing differences between the values of said local maxima in transmission coefficient.

BRIEF DESCRIPTION OF THE DRAWINGS

An implementation of the invention is described below by way of a preferred embodiment and with reference to the accompanying figures.

MORE DETAILED DESCRIPTION

Figure 2:
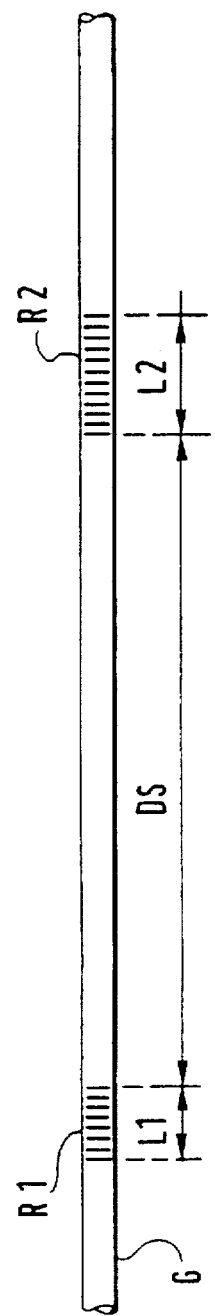
FIG. 2 shows a filter of the preferred embodiment.
Figure 5:
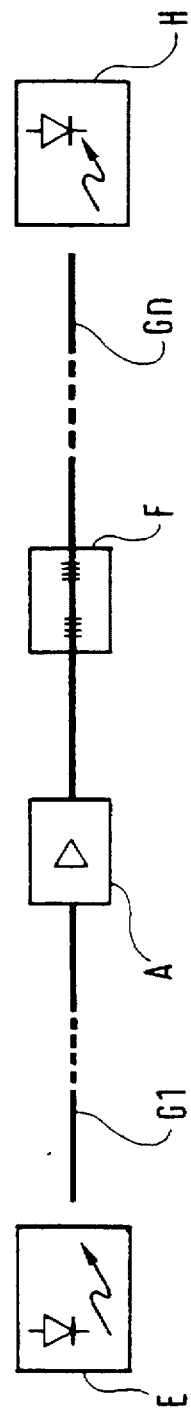
FIG. 5 shows a link using the filter of the invention.

As shown in FIG. 2, a filter of the present invention comprises two Bragg gratings R1 and R2 that follow one another along a common light waveguide G so that each of them reflects a portion of the guided light to be filtered. Between them, these two gratings is a gap DS so that together they constitute a Fabry-Perot filter whose transmission coefficient presents a succession of local maxima M1, . . . , M10 as a function of wavelength. These two gratings differ mutually in such a manner as to impart differences between the values of the local maxima in transmission coefficient. These differences may be used, in particular, to compensate for the unwanted differences in level that appear between waves whose wavelengths coincide with respective local maxima. This difference between the two Bragg gratings is advantageously a difference in their respective lengths L1 and L2.

By way of example, each of the two gratings is a fixed-pitch grating and the tuning wavelengths and the refractive index contrasts of the two gratings are identical. It would nevertheless be possible to use a difference in contrast, but that would be more complex to implement.

The light guide G is typically an optical fiber.

Figure 1:
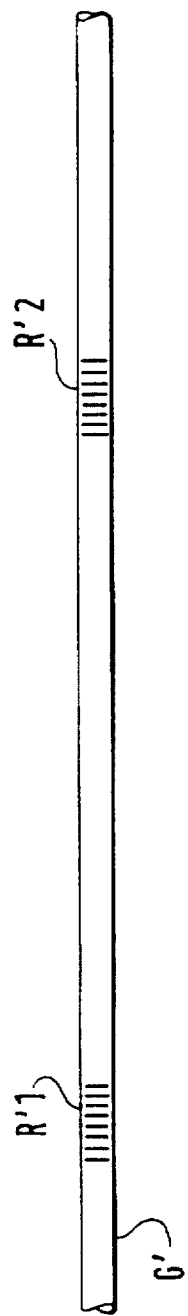
FIG. 1 shows a filter analogous to a known filter.

By way of example, the filter of FIG. 1 is analogous to that described in the article "Fiber Fabry-Perot interferometer using side exposed fiber Bragg gratings", by W. W. Morey, T. J. Bailey, W. H. Glenn, and G. Meltz, published in OFC'92, WA2, on page 96. It comprises a waveguide G' having two identical gratings R'1 and R'2 of length 0.25 mm that are spaced apart by a distance of 2.06 mm and that are tuned to a wavelength of about 1,558 nm. The gratings R1 and R2 of the filter F in FIG. 2 have respective lengths of 0.25 mm and of 0.35 mm and they are separated by a distance of 2.01 mm, with the tuned wavelength being the same as above.

Figure 3:
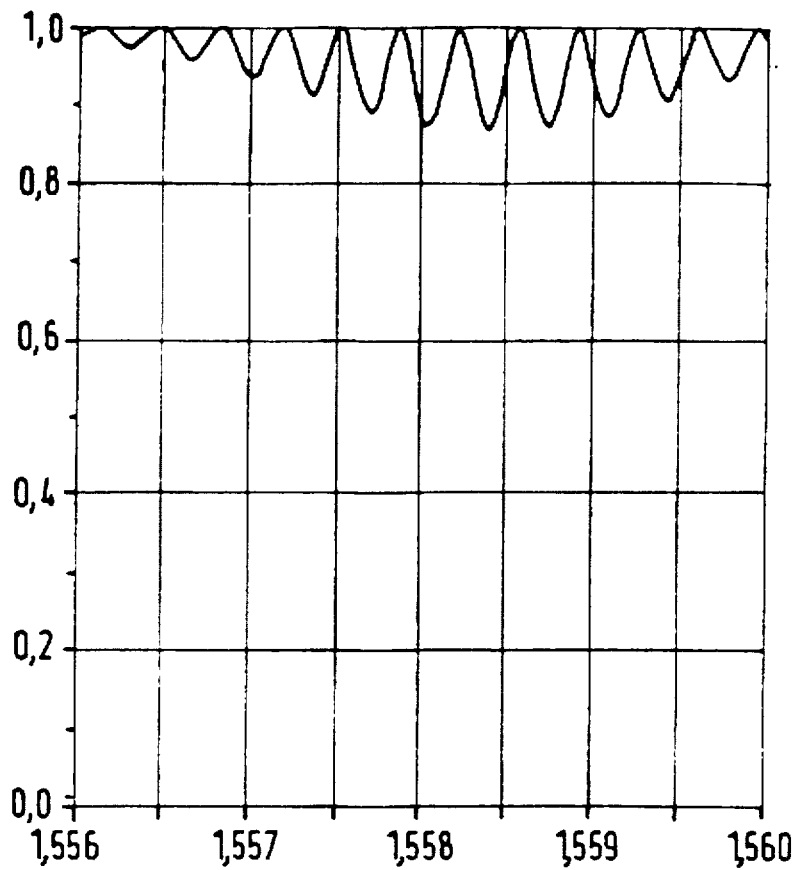
FIGS. 3 and 4 are respective graphs for the above two filters, showing variation in transmission coefficient as a function of wavelength plotted along the abscissa.
Figure 4:
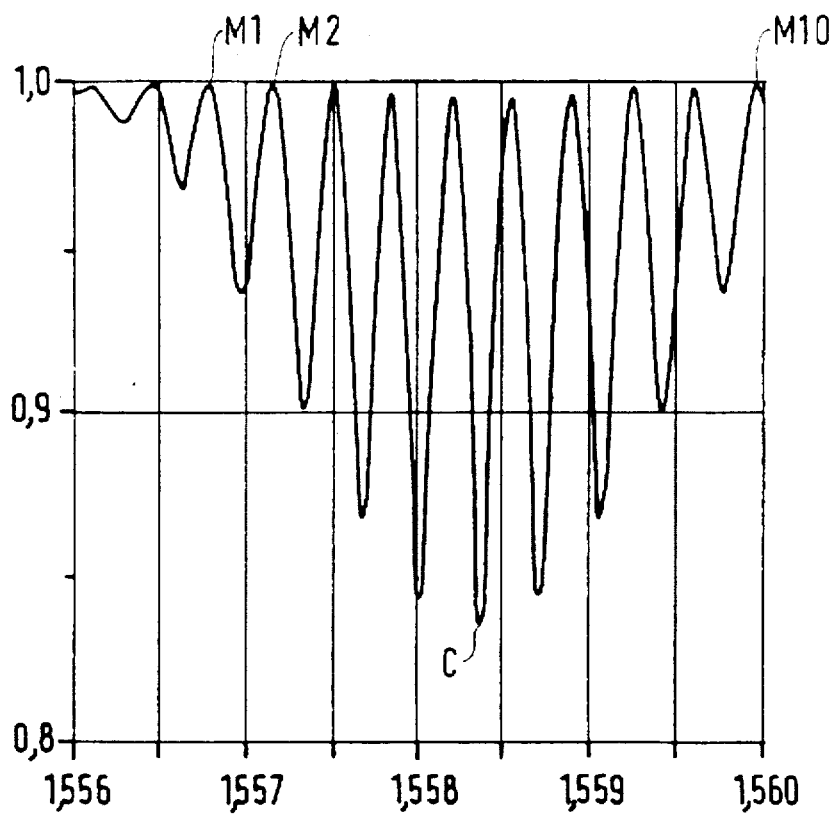

The graphs of FIGS. 3 and 4 are computed for the case where phase matching is achieved between the two Bragg gratings, as can be done, in particular, by making both gratings in a single inscription operation. Such an operation can be performed using known methods.

In the present invention, it is preferable to perform such phase matching.

The present invention provides an optical fiber link, in particular a soliton link, that uses the above-described filter. This optical fiber link includes the following elements:

An emitter E for emitting information-carrying optical signals occupying channels that are regularly spaced apart in a spectrum band constituting a transmission band. Typically, in each channel, these signals present the form of solitons.

Line fibers G1, . . . , Gn that follow one another in series to make up a line that conveys the signals.

At least one amplifier A inserted in series in the line. Typically the amplifier comprises a succession of erbium-doped optical fiber amplifiers. They are used to compensate for line losses. Each amplifier presents gain in each of the channels. A graph of said gain as a function of the center wavelength of each channel typically presents a curve constituting a gain curve.

At least one filter F inserted in the line. The filter is typically constituted by a succession of filters each associated with a respective amplifier. Each filter comprises two Bragg gratings R1, R2 following each other along a light guide G that is typically constituted by a fiber connected in series in the link. The two gratings follow one another a gap DS therebetween so that together they constitute a Fabry-Perot type filter whose transmission coefficient as a function of wavelength presents a regular succession of local maxima M1, . . . , M10 as can be seen in FIG. 4. These maxima coincide with the center wavelengths of the channels. These center wavelengths are preferably distributed symmetrically over the local maxima about the corresponding central minimum C in the transmission coefficient.

Finally, a receiver H serves to receive the optical signals output by the line and to restore the information carried by the signals.

For each channel, the link made in this way presents composite gain that increases with the gain of each amplifier for the channel. The composite gain also increases with a local maximum in the transmission coefficient of each filter, the maximum being the maximum that coincides with the center wavelength of the channel. In the simple case where the line comprises a single amplifier and a single filter and where all of the other members present gain or loss that are independent of the wavelength, the composite gain for each channel is proportional to the product of the amplifier gain multiplied by the local maximum of the transmission coefficient of the filter. Nevertheless, when line losses are taken into account, the composite gain over one amplification step is typically zero, when expressed in decibels.

According to the present invention, the two gratings R1 and R2 of the filter F, i.e. of at least one filter and preferably of all of the filters in the above-mentioned succession, present a mutual difference that imparts useful differences between the values of the local maxima in transmission coefficient of the filter, which useful differences are suitable for compensating, at least in part, the unwanted differences between the composite gains of the various channels in the link and due to other causes.

Naturally, the desired object is to achieve equal composite gains for all of the channels.

Typically, each filter is used to compensate the gain curve of an associated amplifier in the line which itself includes numerous amplifiers. Compensation is thus distributed along the length of the line. This is particularly desirable in a soliton link since the energy of a soliton must be subject to variations that are limited, only.

As previously mentioned, for this purpose, the difference between the two gratings of the filter is preferably merely a difference in the lengths of the gratings.

We claim:

1. A Fabry-Perot filter defining successive transmission maxima for guided light, the filter comprising two Bragg gratings which follow each other along a common light guide, the two gratings being separated by a gap, wherein the two gratings have different respective lengths for imparting differences between at least two of said successive transmission maxima.

2. A filter according to claim 1, wherein the two Bragg gratings are tuned to the same wavelength.

3. A filter according to claim 1, wherein the two Bragg gratings are mutually matched in phase.

4. An optical fiber link comprising:

an emitter for emitting information-carrying optical signals occupying channels that follow one another regularly in a spectrum band constituting a transmission band;

line fibers following one another in series to make up a line for conveying the signals;

at least one amplifier inserted in series in the line, each amplifier presenting gain in each of the channels;

at least one filter inserted in the line, each filter comprising two Bragg gratings following each other along a light guide and leaving between them a gap so that together they constitute a Fabry-Perot type filter whose transmission coefficient presents a regular succession of local maxima as a function of wavelength and coinciding with the center wavelengths of the channels; and a receiver for receiving the optical signals output by the line and for restoring the information carried by the signals;

the link constituted in this way presenting composite gain for each channel that increases with the gain of each amplifier for the channel, said composite gain also increasing with a local maximum in the transmission coefficient of each filter, said maximum being the maximum that coincides with the center wavelength of the channel;

wherein the two gratings of said filter are of different respective lengths, thereby imparting useful differences between the values of the local maxima in the transmission coefficient of the filter, which differences are suitable for compensating, at least in part, unwanted differences that appear between the composite gains of the link for the various channels due to other causes.

* * * * *